US005298193A

United States Patent [19]

Klinger et al.

[11] Patent Number: 5,298,193

[45] Date of Patent: Mar. 29, 1994

[54] LOW-FOAMING AND LOW-TEMPERATURE-STABLE LIQUID SURFACTANT COMPOSITIONS COMPOSED OF WATER AND NONIONIC, ANIONIC AND CATIONIC SURFACTANTS AND THE USE THEREOF

[75] Inventors: Wolfgang Klinger, Altötting; Eckhard Milewski, Kriftel, both of Fed. Rep. of Germany

[73] Assignee: Hoechst Aktiengesellschaft, Frankfurt, Fed. Rep. of Germany

[21] Appl. No.: 890,431

[22] Filed: May 28, 1992

Related U.S. Application Data

[63] Continuation of Ser. No. 504,232, Apr. 4, 1990, abandoned.

[30] Foreign Application Priority Data

Apr. 6, 1989 [DE] Fed. Rep. of Germany ....... 3911098

[51] Int. Cl.[5] ........................ B01F 17/00; C11D 1/65; C11D 1/86; B01J 13/00

[52] U.S. Cl. .................................... 252/355; 252/312; 252/547

[58] Field of Search ............... 252/351, 355, 357, 312, 252/314, 547

[56] References Cited

U.S. PATENT DOCUMENTS

| | | | |
|---|---|---|---|
| 2,398,295 | 3/1943 | Epstein et al. | 252/355 |
| 2,779,741 | 1/1957 | Cross | 252/357 |
| 3,668,136 | 6/1972 | Barker | 252/355 X |
| 3,684,736 | 8/1972 | Groves et al. | 252/355 |
| 3,817,871 | 6/1974 | Graff | 252/355 X |
| 4,235,759 | 11/1980 | Ohbu et al. | 252/545 |
| 4,392,965 | 7/1983 | Woodward et al. | 252/547 X |
| 4,751,009 | 6/1988 | Damaso et al. | 252/8.75 |
| 4,810,409 | 3/1989 | Harison et al. | 252/547 X |
| 4,888,119 | 12/1989 | Klewsaat | 252/547 X |
| 4,913,828 | 4/1990 | Caswell et al. | 252/547 X |
| 4,919,839 | 4/1990 | Durbut et al. | 252/547 |

FOREIGN PATENT DOCUMENTS 2195653 4/1988 United Kingdom .

OTHER PUBLICATIONS

Derwent Abstract, 80155A/45.

*Primary Examiner*—Robert L. Stoll
*Assistant Examiner*—Daniel S. Metzmaier
*Attorney, Agent, or Firm*—Connolly and Hutz

[57] ABSTRACT

The novel surfactant compositions are obtained by mixing 1 part by weight of at least one nonionic surfactant and 0.3 to 9 parts by weight of a specific mixture composed of water and at least one anionic surfactant and at least one cationic surfactant. The said surfactant compositions are concentrated and generally clear liquids which, in particular, have good foaming and wetting characteristics, low surface tension and a low pour point and are versatile by virtue of these particular properties.

9 Claims, No Drawings

LOW-FOAMING AND LOW-TEMPERATURE-STABLE LIQUID SURFACTANT COMPOSITIONS COMPOSED OF WATER AND NONIONIC, ANIONIC AND CATIONIC SURFACTANTS AND THE USE THEREOF

This application is a continuation of application Ser. No. 07/504,232, filed Apr. 4, 1990 now abandoned.

The invention relates to low-foaming and low-temperature-stable liquid surfactant compositions which are essentially composed of water and nonionic, anionic and cationic surfactants. The invention further relates to a process for the preparation of these surfactant compositions and their use.

It has long been known to combine anionic surfactants and cationic surfactants in a mole ratio of about 1 : 1 in the presence of water. These confirmations of an anionic surfactant and a cationic surfactant (anionic/cationic surfactant complexes) are described as aqueous suspensions or emulsions and, in the case of relatively high concentrations,, as gelatinous materials. For instance, U.S. Pat. No. 3,684,736 discloses a surfactant composition which is essentially composed of an ether sulfate as the anionic surfactant and dodecylbenzyltrimethylammonium chloride as the cationic surfactant in the ratio of 1:1 and of more than 99% by weight of water. This patent specification states prominently on several occasions that a manipulable suspension is only obtained at this low concentration of surfactant and that compositions which are only slightly higher in concentration are no longer liquid but gelatinous materials. The above US patent specification furthermore discloses that the relevant surfactant compositions give a lower surface tension and a lower foaming index than the anionic surfactant or cationic surfactant alone.

Since, then, compositions which contain an anionic surfactant and a cationic surfactant have very advantageous surfactant properties, it would be extremely desirable to have access to compositions of this type which are liquid even at relatively high surfactant concentration and hence are readily manipulable.

Surfactant compositions of this type are described in the recent British Patent Application No. 2,195,653. These are aqueous emulsions consisting essentially of 10 parts of an anionic surfactant and a cationic surfactant in a mole ratio of about 1:1, 0.5 to 10 parts of an emulsifier and 15 to 100 parts of water. The emulsion is prepared, in short, by mixing the cationic and anionic surfactants in the above ratio, heating the mixture until it melts, mixing the cooled, solidified melt with the emulsifier, heating this mixture until it is liquid, and adding water until the desired oil-in-water emulsion has been produced.

Although the liquid surfactant formulations described in the British Patent Application No. 2,195,653 contain, at least on some occasions, a considerably larger amount of surfactant than those of the abovementioned U.S. patent specification, they still have, like the latter, a high degree of emulsion- or suspension-like character and are therefore not clear liquid compositions. The emulsions according to the abovementioned British patent application furthermore have the disadvantage that their preparation is expensive and complicated.

There is therefore a need for a surfactant formulation composed of water, anionic surfactants and cationic surfactants which has a high surfactant concentration and at the same time is essentially a clear solution. Furthermore, this surfactant formulation must be simple to prepare and have advantageous properties. Surfactant formulations of this type are proposed in German Patent Application P 39 08 008.0 (filing date, March 11th, 1989). They consist essentially of (a) 15 to 70% by weight of water and (b) 30 to 85% by weight of at least one anionic surfactant and at least one cationic surfactant in a mole ratio of 1:(0.3 to 10), and the cationic surfactant is a quaternary ammonium salt of the formula $N^+(R^1,R^2,R^3,R^4)X^-$ (1) in which $R^1$ and $R^2$ are an alkyl radical having 1 to 4 carbon atoms or an oxyalkylene radical having 1 to 10 ethylene oxide units, propylene oxide units or ethylene oxide units and propylene oxide units, $R^3$ is an alkyl radical or an alkenyl radical having 6 to 22 carbon atoms, $R^4$ is an alkyl radical or an alkenyl radical having 6 to 22 carbon atoms or a benzyl radical and $X^-$ is an anion of an inorganic or organic acid. These surfactant compositions are prepared by mixing at least one anionic surfactant and at least one cationic surfactant in a mole ratio of 1:(0.3 to 10) with water in an amount from 50 to 80% by weight, based on the total weight of anionic surfactant, cationic surfactant and water, at a temperature of 25° to 95° C. with the formation of two phases, allowing the two phases to separate and then separating off the desired upper concentrated surfactant phase from the lower salt phase.

Starting from the surfactant formulations of the above-mentioned German Patent Application P 39 08 008.0, it was surprisingly found that combining these formulations with nonionic surfactants gives liquid compositions with excellent surfactant properties. The surfactant compositions thus obtained are liquid (and therefore readily manipulable) and essentially clear concentrates which, among other properties, have a surprisingly low tendency to foam and surprisingly good low-temperature characteristics. For instance, the pour points of these surfactant concentrates are far below those of the starting surfactants, which can be ascribed to an unexpectedly high synergistic effect.

Prior art compositions exist which contain water and nonionic, anionic and cationic surfactants. Compositions of this type result for example when the relevant surfactants are present, in addition to a large amount of water, in a washing machine. French Patent 2,388,882 discloses solid surfactant compositions composed of nonionic, anionic and cationic surfactants. It is self-evident that all of these surfactant mixtures are far removed from those of the invention.

The present invention accordingly provides low-foaming and low-temperature-stable liquid surfactant compositions which have been prepared by mixing 1 part by weight of at least one nonionic surfactant and 0.3 to 9 parts by weight, preferably 0.4 to 4 parts by weight, in particular 0.4 to 2.5 parts by weight, of a surfactant formulation which is composed of 20 to 60% by weight of water, preferably 20 to 50% by weight, and 40 to 80% by weight, preferably 50 to 80% by weight of at least one anionic surfactant and at least one cationic surfactant in a mole ratio of 1:(0.3 to 5). preferably 1:(0.4 to 2), and the cationic surfactant is a quaternary ammonium salt of the formula $N^+(R^1,R^2,R^3,R^4)X^-$(1) in which $R^1$ and $R^2$ are an alkyl radical having 1 to 4 carbon atoms or an oxyalkylene radical having 1 to 10 ethylene oxide units, propylene oxide units or ethylene oxide units and propylene oxide units, $R^3$ is an alkyl radical or an alkenyl radical having 6 to 22 carbon atoms, $R^4$ is an alkyl radical or an alkenyl radical having 6 to 22 carbon atoms or the benzyl radical and $X^-$ is an anion of an inorganic or organic acid.

Although the surfactant formulations to be used according to the invention are comprehensively described in the abovementioned German Patent Application P 39 08 008.0, which is incorporated here, they are nevertheless briefly described below.

These surfactant formulations are generally clear liquids with a high proportion of, as a rule, an anionic and a cationic surfactant and therefore these are concentrated solutions of aqueous anionic/cationic surfactant complexes. The anionic and cationic surfactants which are to be used for the preparation of the surfactant formulations are known and commercially available. The anionic surfactants used are preferably those of the sulfonate type and the sulfate type (preferably with an alkali metal or ammonium as the cation). Preferred examples of these anionic surfactants are as follows:

$C_6$ to $C_{22}$-alkanesulfonates,
$C_6$ to $C_{22}$-$\alpha$-olefinsulfonates,
($C_6$ to $C_{22}$-alkyl)benzenesulfonates,
N-$C_6$ to $C_{22}$-acyl-N-methyl-1-aminoethane-2-sulfonates (these are taurine derivatives),
mono-$C_6$ to $C_{22}$-alkyl sulfosuccinates or di-$C_6$ to $C_{22}$-alkyl sulfosuccinates,
$C_6$ to $C_{22}$-fatty alcohol sulfates or oxyethylated $C_6$ to $C_{22}$-fatty alcohol sulfates having 1 to 20 ethylene oxide units, where particular preference is given to the abovementioned alkanesulfonates, $\alpha$-olefinsulfonates, fatty alcohol sulfates and oxyethylated fatty alcohol sulfates. Among the abovementioned $C_6$ to $C_{22}$-radicals, preference is given to $C_8$ to $C_{18}$-radicals (it is self-evident that the abovementioned hydrophobic groups having 6 to 22 carbon atoms, preferably 8 to 18 carbon atoms may also contain double bonds, as a rule f rom 1 to 3). Other suitable anionic surfactants are listed individually below: sodium $C_{13}$ to $C_{17}$-alkanesulfonate(primary or secondary alkanesulfonate), sodium $C_{14}$ to $C_{16}$-$\alpha$-olefinsulfonate, sodium dodecylbenzenesulfonate, the sodium salt of N-oleyl-N-methyltaurine, sodium dioctylsulfosuccinate, the sodium salt of the methyl ester of $\alpha$-sulfo-$C_{14}$ to $C_{18}$-fatty acids, sodium lauryl sulfate, sodium palmityl sulfate, sodium coconutalkyl sulfate, sodium monoethoxydodecanol sulfate, sodium $C_{12}$ to $C_{14}$-alkyl sulfate oxyethylated with 3 mol of ethylene oxide, sodium tallowalkyl sulfate oxyethylated with 10 mol of ethylene oxide, and sodium tributylphenol sulfate oxyethylated with 7 mol of ethylene oxide. While the type of anionic surfactant is generally not crucial, only certain quaternary ammonium salts are suitable as cationic surfactants (for instance quaternary ammonium salts are unsuitable if the nitrogen atom has three or more short aliphatic radicals as in lauryltrimethylammonium chloride, tallowalkyltrimethylammonium chloride and dodecylbenzyltrimethylammonium chloride (cf. U.S. Pat. No. 3,684,736 above).

The quaternary ammonium salts which are to be used according to the invention conform to the above mentioned formula 1

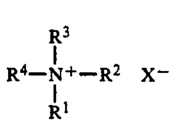

in which $R^1$ to $R^4$ and $X^-$ have the meanings given above. Preferred examples of cationic surfactants are those of the formula 1 in which $R^1$ and $R^2$ (which may be identical or different) are an alkyl radical having 1 to 4 carbon atoms or an oxyalkylene radical having 1 to 10, preferably 1 to 5 ethylene oxide units, propylene oxide units or ethylene oxide units and propylene oxide units, $R^3$ is an alkyl radical having 8 to 14 carbon atoms, preferably 8 to 10 carbon atoms, $R^4$ has one of the meanings of $R^3$ or is the benzyl radical and $X^-$ is an anion of an inorganic or organic acid (the $C_1$ to $C_4$-alkyl radicals given for $R^1$ and $R^2$ are preferably methyl or ethyl).

Examples of the anion $X^-$ in the cationic surfactants are inorganic acid radicals such as halide, preferably chloride or bromide, borate, phosphate and sulfate, organic acid radicals of monobasic or polybasic, saturated or unsaturated, aliphatic or aromatic acids such as formate, acetate, propionate, laurate, stearate, oleate, lactate, citrate, sorbate, benzoate, salicylate and $C_1$ to $C_3$-alkosulfate anions, preferably the methosulfate anion. Other suitable cationic surfactants are given individually below: dioctyldimethylammonium chloride, octadecyldimethyl-, didecyldimethyl-, dilauryldimethyl-, dioleyldimethyl-, di-coconutalkyldimethyl- and di-tallowalkyldimethyl-ammonium chloride, myristyldimethylbenzylammonium chloride and stearyldimethylbenzylammonium chloride, didecyl-methyl-oxyethylammonium propionate, dioctyl-polyoxyethylammonium propionate, and di-tallowalkyl-methyl-oxypropylammonium chloride.

The surfactant formulations which are to be used according to the invention are the result of a specific method of mixing the components water, anionic surfactant and cationic surfactant. An anionic surfactant and a cationic surfactant of the type mentioned above are mixed in a mol ratio of 1:(0.3 to 5), preferably 1:(0.4 to 2), with water in an amount from 50 to 80% by weight, preferably 60 to 80% by weight, the weights percent being based on the total weight of anionic surfactant, cationic surfactant and water, at a temperature of 25° to 95° C., preferably 40° to 85° C., with the formation of two phases; the phases are allowed to separate and the desired upper concentrated surfactant phase is separated off from the lower salt phase. As is well-known, the anionic surfactants and cationic surfactants which are to be used are often in the form of solids or a gelatinous surfactant-water mixture. In particular, the anionic surfactant, the cationic surfactant and water, preferably demineralized water, are mixed in the given amounts in a reaction vessel at a temperature of 25° to 95° C., preferably 40° to 85° C., preferably with stirring, and two phases are formed. It is not crucial in which order the three components are introduced into the reaction vessel. What is important is that the three components are thoroughly mixed at the given temperature. As a rule, the mixing time is 5 to 90 minutes. With less than 5 minutes, even with vigorous stirring, intimate mixing of the components is not in general achieved, and with more than 90 minutes there is generally no further increase in the degree of mixing. For -these reasons, the mixing time is advantageously 20 to 60 minutes. When mixing of the components at the given mixing temperature has ended, the reaction vessel is allowed to stand until the contents have separated into an upper and lower phase. During this waiting time, which can be from about 30 minutes to several hours, the contents usually cool to room temperature. Of the two sharply distinguished phases, the upper phase (surfactant phase) is the desired concentrated, liquid and at the same time clear, aqueous surfactant formulation, while the lower phase (salt phase) contains essentially the aqueous solution of the salt formed from the anion of the cationic surfactant and the cation of the anionic surfactant. The desired surfactant phase (which, apart from the water and surfactant components may also contain a little salt) can be isolated, for example, simply by decanting.

The low-foaming and low-temperature-stable liquid surfactant composition according to the invention comprises, apart from the surfactant formulation described above, at least one nonionic surfactant as a further component. The nonionic surfactants used are preferably those from the group of polyglycol ethers (as a rule, only one nonionic surfactant is used). Preferred examples of this group are (a) the oxyalkylates of $C_8$ to $C_{18}$-alcohols (fatty alcohols, oxoalcohols), ($C_4$ to $C_{12}$-alkyl)-phenols (mono-, di- or tri-alkylsubstituted), $C_8$ to $C_{18}$-fatty acids, $C_8$ to $C_{18}$-fatty amines, $C_8$ to $C_{18}$-fatty acid amides and ($C_8$ to $C_{18}$-fatty acid)ethanolamides with (in each case) 2 to 30, preferably 4 to 15, ethylene oxide units, propylene oxide units or ethylene oxide and propylene oxide units (in the oxyalkylate group) and (b) the likewise known nonionic ethylene oxide/propylene oxide block copolymer surfactants which are composed of a propylene oxide inner block having a molecular weight from 1,000 to 3,000 and of 5 to 50% by weight of (condensed on) ethylene oxide, the percentages by weight being based on the block copolymer. Particularly preferred nonionic surfactants are the above oxyalkylates in the form of the polyethylene glycol ethers (oxyethylates) and ethylene oxide/propylene oxide block copolymers which are composed of a propylene oxide inner block having a molecular weight from 1,500 to 2,500 and of 10 to 30% by weight of ethylene oxide, the percentages by weight being based on the block copolymer. Preference is given to the use of nonionic surfactants having a cloud point, measured in butyl diglycol in accordance with DIN 53 917, of 30° to 100° C. The nonionic surfactants which are to be used according to the invention are known and commercially available. As a rule they are anhydrous liquids with a greater or lesser viscosity but may occasionally contain about 10 to 20% by weight of water.

The low-foaming and low-temperature-stable liquid surfactant compositions according to the invention are prepared by combining the two components, namely the nonionic surfactant and the surfactant formulation, in a ratio by weight of 1:(0.3 to 9), preferably 1:(0.4 to 4), in particular 1:(0.4 to 2.5), preferably with stirring. Nixing of the two components is carried out at room temperature or while heating to a temperature of 30° to 80° C., preferably 40° to 60° C. The two components mix relatively quickly to form a homogeneous and essentially clear liquid (particularly if they are mixed while heating). It is not crucial in which order the components are combined. What is important is merely that the above ratios by weight are observed. Depending on the type of components and the mixing temperature, the mixing time is generally 5 to 30 minutes. The surfactant compositions according to the invention are essentially composed of an anionic and a cationic surfactant (anionic/cationic surfactant complex), a nonionic surfactant and water. The amount of water results essentially from the surfactant formulation used and is, depending on the surfactant formulation and mixing ratio of surfactant formulation and nonionic surfactant, 5 to 50% by weight, preferably 10 to 30% by weight, the percentages by weight being based on the surfactant composition.

The surfactant compositions according to the invention have a range of advantages. They are surfactants in the form of concentrated and generally clear liquids which in particular produce relatively little foam (good foaming characteristics), and have good wetting characteristics and low pour points (good low-temperature characteristics). Even when nonionic surfactant concentrates of relatively high viscosity and cloudy appearance are used, clear and liquid, and therefore readily manipulable, compositions are obtained from the said mixing with the surfactant formulations described. They have only a slight tendency to foam and good wetting indices. These indices are particularly good if the cationic surfactant in the surfactant formulation used has a relatively short-chain hydrocarbon radical. A particular feature of the surfactant compositions according to the invention is their surprisingly good low-temperature characteristics. Their pour points are generally lower than the pour points of the two components, namely the surfactant formulation and the nonionic surfactant, which is obviously the result of the unexpectedly high synergistic effect. Mixing according to the invention allows the preparation of virtually tailor-made surfactant compositions which, in comparison with the two starting surfactants, often have greatly improved properties and correspondingly increased versatility. Depending on the selection of the surfactant formulations described and of the nonionic compounds, mixtures can be prepared which, in particular, have one or more of the following properties: good foaming and wetting characteristics, low surface tension, high clarity and excellent low-temperature characteristics. The surfactant compositions according to the invention can be used as such or diluted with solvents such as water or alcohols.

The surfactant compositions according to the invention are advantageously used for preparing low-foaming and low-temperature-stable surfactant concentrates by blending them with deficient surfactant products in order to impart in particular low-foaming characteristics and low-temperature stability (low pour point) to these products.

The invention will now be explained in more detail using examples.

Firstly, 10 anionic surfactants and cationic surfactants are given, these having been used to prepare the corresponding 10 surfactant formulations:

1: sodium $C_{13}$ to $C_{17}$-alkanesulfonate and di-tallowalkyldimethylammonium chloride, 2: sodium $C_{14}$ to $C_{16}$-α-olefinsulfonate and dioctylmethyl-oxyethylammoniumpropionate (obtained by reacting dioctylmethylamine with 4 mol of ethylene oxide and 1 mol of propionic acid per mol of tertiary amine), 3: sodium $C_{12}$ to $C_{14}$-alkyl sulfate oxyethylated with 3 mol of ethylene oxide, and dioctyldimethylammonium chloride, 4: sodium $C_{13}$ to $C_{17}$-alkanesulfonate and dioctyldimethylammonium chloride,
5: sodium $C_{13}$ to $C_{17}$-alkanesulfonate and dicoconutalkyldimethylammonium chloride,
6: sodium $C_{14}$ to $C_{16}$-α-olefinsulfonate and dioctylmethyl-oxyethylammoniumpropionate (obtained by reacting dioctylmethylamine with 4 mol of ethylene oxide and 1 mol of propionic acid per mol of tertiary amine),
7: sodium $C_{12}$ to $C_{14}$-alkyl sulfate oxyethylated with 3 mol of ethylene oxide, and dioctyldimethylammonium chloride,
8: sodium N-oleoyl-N-methyltauride and didecyloxyethyl-methylammonium propionate (obtained by reacting didecylmethylamine with 4 mol of ethylene oxide and 1 mol of propionic acid per mol of tertiary amine).
9: Sodium tributylphenol sulfate oxyethylated with 7 mol of ethylene oxide, and dioctyldimethylammonium chloride,
10: sodium $C_{13}$ to $C_{17}$-alkanesulfonate and dioctyldimethylanmonium chloride.

The preparation and the composition of the surfactant formulations 1 to 10 are described in more detail below:

Surfactant Formulation 1

A mixture composed of 70% by weight of water and 304 by weight of anionic surfactant 1 and cationic surfactant 1 in the mole ratio 1:1 was well stirred for 30 minutes at 80° C. Then the stirring and heating were interrupted and the contents of the beaker (in which the formation of two phases was observed) were left to stand for 5 hours at room temperature. By this time, two sharply distinguished phases had formed. The upper clear phase which is the desired surfactant phase or surfactant formulation 1 was isolated by decanting from the lower phase which is the aqueous salt phase (NaCl). The liquid and slightly cloudy surfactant formulation 1 was composed of 26% by weight of water and 74% by weight of anionic surfactant 1 plus cationic surfactant 1 in the mole ratio 1:1 (the salt content was below 0.1% by weight).

If the contents of the beaker are left to stand, as above, after stirring has ended with the temperature being maintained at 80° C., the formation of the two sharply distinguished phases occurs after only one hour (waiting time); leaving the mixture to stand while maintaining the temperature therefore considerably accelerates the separation of the two phases.

Surfactant Formulation 2

A mixture composed of 70% by weight of water and 30% by weight of anionic surfactant 2 and cationic surfactant 2 in the mole ratio 1:1 was well stirred for 30 minutes at 70° C. and further treated as with surfactant formulation 1. The liquid and clear surfactant formulation 2 was composed of 454 by weight of water and 55% by weight of anionic surfactant 2 and cationic surfactant 2 in the mole ratio 1:1 (the salt content was below 0. 14 by weight).

Surfactant Formulation 3

A mixture composed of 70% by weight of water and 30% by weight of anionic surfactant 3 and cationic surfactant 3 in the mole ratio 1:1 was well stirred for 45 minutes at 80° C. and further treated as with surfactant formulation 1. The liquid and clear surfactant formulation 3 was composed of 32% by weight of water and 68% by weight of anionic surfactant 3 and cationic surfactant 3 in the mole ratio 1:1 (the salt content was below It by weight).

Surfactant Formulation 4

A mixture composed of 70% by weight of water and 30% by weight of anionic surfactant 4 and cationic surfactant 4 in the mole ratio 1:1 was well stirred for 30 minutes at 60° C. and further treated as with surfactant formulation 1. The liquid and clear surfactant formulation 4 was composed of 27% by weight of water and 73% by weight of anionic surfactant 4 and cationic surfactant 4 in the mole ratio 1:1 (the salt content was below 1% by weight; the salt content was more or less below 1% by weight with the other surfactant formulations also).

Surfactant Formulation 5

A mixture composed of 70% by weight of water and 30% by weight of anionic surfactant 5 and cationic surfactant 5 in the mole ratio 1:0.4 was well stirred for 1 hour at 80° C. and further treated as with surfactant formulation 1. The liquid and clear surfactant formulation 5 was composed of 55% by weight of water and 45% by weight of anionic surfactant 5 and cationic surfactant 5 in the mole ratio 1:0.4.

Surfactant Formulation 6

A mixture composed of 70% by weight of water and 30% by weight of anionic surfactant 6 and cationic surfactant 6 in the mole ratio 1:0.7 was well stirred for 30 minutes at 70° C. and further treated as with surfactant formulation 1. The liquid and clear surfactant formulation 6 was composed of 58% by weight of water and 42% by weight of anionic surfactant 6 and cationic surfactant 6 in the mole ratio 1:0.7.

Surfactant Formulation 7

A mixture composed of 70% by weight of water and 30% by weight of anionic surfactant 7 and cationic surfactant 7 in the mole ratio 1:1.5 was well stirred for 1 hour at 80° C. and further treated as with surfactant formulation 1. The liquid and clear surfactant formulation 7 was composed of 414 by weight of water and 59% by weight of anionic surfactant 7 and cationic surfactant 7 in the mole ratio 1:1.5.

Surfactant Formulation 8

A mixture composed of 70% by weight of water and 30% by weight of anionic surfactant 8 and cationic surfactant 8 in the mole ratio 1 : 1.7 was well stirred for 90 minutes at 80° C. and further treated as with surfactant formulation 1. The liquid and clear surfactant formulation 8 was composed of 30% by weight of water and 70% by weight of anionic surfactant 8 and cationic surfactant 8 in the mole ratio 1:1.7.

Surfactant Formulation 9

A mixture composed of 70% by weight of water and 30% by weight of anionic surfactant 9 and cationic surfactant 9 in the mole ratio 1:4 was well stirred for 1 hour at 80° C. and further treated as with surfactant formulation 1. The liquid and clear surfactant formulation 9 was composed of 48% by weight of water and 52% by weight of anionic surfactant 9 and cationic surfactant 9 in the mole ratio 1:4.

Surfactant Formulation 10

A mixture composed of 70% by weight of water and 30% by weight of anionic surfactant 10 and cationic surfactant 10 in the mole ratio 1:2 was well stirred for 30 minutes at 60° C. and further treated as with surfactant formulation 1. The liquid and clear surfactant formulation 10 was composed of 32% by %light of water and 68% by weight of anionic surfactant 10 and cationic surfactant 10 in the mole ratio 1:2.

12 nonionic surfactants are given below, these having been used in the examples according to the invention with the surfactant formulations 1 to 10:

1: isotridecylalkanol oxyethylated with 8 mole of ethylene oxide per mole of alkanol, 2: $C_{12}$ to $C_{15}$-alkanol oxyethylated with 6 mole of ethylene oxide per mole of alkanol, 3: undecylalkanol oxyethylated with 11 mole of ethylene oxide per mole of alkanol, 4: $C_{10}$ to-$C_{12}$-alkanol alkoxylated with 4 mole of ethylene oxide and 4 mole of propylene oxide per mole of alkanol, 5: coconutfatty alcohol plus 9 mole of ethylene oxide and terminated with n-$C_4H_9$, 6: nonylphenol oxyethylated with 4 mole of ethylene oxide per mole of nonylphenol, 7: tributylphenol oxyethylated with 30 mole of ethylene oxide per mole of tributylphenol, 8: coconutfatty acid oxyethylated with 10 mole of ethylene oxide per mole of coconutfatty acid, 9: stearylamine oxyethylated with 15 mole of ethylene oxide per mole of stearylamine, 10: coconutfatty acid monoethanolamide oxyethylated with 5 mole of ethylene oxide per mole of amide, 11: the triethanolamine salt of coconutalkylamidopolyglycol ether sulfate obtained by sulfation of coconutalkaylamide plus 3 mole of ethylene oxide and forming the salt with triethanolamine, 12: ethylene oxide/propylene oxide block copolymer obtained by reacting a polypropylene glycol block having a molecular weight of about 1,700 with ethylene oxide such that the ethylene oxide/propylene oxide block copolymer contains 20% by weight of ethylene oxide, the percentages by weight being based on the block copolymer.

Examples According to the Invention

Example 1

300 g of the nonionic surfactant 1 and 700 g of the surfactant formulation 4 were introduced into a beaker and stirred for 20 minutes at room temperature, producing a liquid and clear mixture. This surfactant composition according to the invention had thus been prepared by mixing at room temperature 1 part by weight of the above nonionic surfactant with 2.3 parts by weight of a surfactant formulation composed of 27% by weight of water and 73% by weight of the above anionic/cationic surfactant in the mole ratio of 1:1.

Example 2

700 g of the nonionic surfactant 2 and 300 g of the surfactant formulation 2 were introduced into a beaker and stirred for 10 minutes at 50° C. producing a liquid and slightly cloudy mixture. This surfactant composition according to the invention had therefore been prepared by mixing at 50° C. 1 part by weight of the above nonionic surfactant with 0.4 parts by weight of a surfactant formulation composed of 45% by weight of water and 55% by weight of the above anionic/cationic surfactant in the mole ratio of 1:1.

Example 3

500 g of the nonionic surfactant 3 and 500 g of the surfactant formulation 2 were introduced into a beaker and stirred for 10 minutes at 60° C. producing a liquid and slightly cloudy mixture. This surfactant composition according to the invention had therefore been prepared by mixing at 60° C. 1 part by weight of the above nonionic surfactant with 1 part by weight of a surfactant formulation composed of 45% by weight of water and 55% by weight of the above anionic/cationic surfactant in the mole ratio of 1:1.

Examples 4 to 15

The Examples 4 to 15 in which likewise a liquid (readily pourable) and more or less clear surfactant composition according to the invention was obtained are summarized in the following Table 1. Table 1 gives data concerning the nonionic surfactants and surfactant formulations used and concerning the ratio by weight of nonionic surfactant to surfactant formulation. Table 1 also contains, for the sake of completeness, the corresponding data from Examples 1 to 3:

TABLE 1

| Example No. | Nonionic surfactant No. | Surfactant formulation No. | Mixing ratio in parts by weight |
|---|---|---|---|
| 1 | 1 | 4 | 1:2.3 |
| 2 | 2 | 2 | 1:0.4 |
| 3 | 3 | 2 | 1:1 |
| 4 | 4 | 4 | 1:1 |
| 5 | 1 | 1 | 1:1 |
| 6 | 4 | 3 | 1:0.7 |
| 7 | 11 | 4 | 1:1 |
| 8 | 5 | 5 | 1:0.7 |
| 9 | 6 | 7 | 1:4 |
| 10 | 7 | 9 | 1:7 |
| 11 | 8 | 6 | 1:7 |
| 12 | 9 | 8 | 1:4 |
| 13 | 10 | 10 | 1:7 |
| 14 | 12 | 8 | 1:7 |
| 15 | 2 | 5 | 1:0.4 |

The following Table 2 gives the properties of the 15 surfactant compositions according to the invention from Examples 1 to 15 namely the pour points, the foaming indexes, the wetting indexes and the surface tensions. Table 2 also shows (in order to allow direct comparison) the pour points, foaming indexes, wetting indexes and surface tensions of the 12 nonionic surfactants and 10 surfactant formulations used to prepare the surfactant compositions.

In Table 2, (for the sake of brevity) the 12 nonionic surfactants used are referred to as A1 to A12 and the 10 surfactant compositions used are referred to a B1 to B10 and the 15 surfactant compositions according to the invention are referred to as C1 to C15.

TABLE 2

| Examples | Pour point °C. | Foaming index ml | Wetting index sec | Surface tension mN/m |
|---|---|---|---|---|
| 1 A1 | +11 | 180 | 10 | 28 |
| B4 | −20 | 20 | 95 | 27 |
| C1 | −25 | 50 | 13 | 27 |
| 2 A2 | +15 | 20 | 75 | 29 |
| B2 | −14 | 40 | 45 | 28 |
| C2 | −15 | 20 | 40 | 29 |

TABLE 2-continued

| Examples | Pour point °C. | Foaming index ml | Wetting index sec | Surface tension mN/m |
|---|---|---|---|---|
| 3 A3 | +30 | 270 | 30 | 38 |
| B2 | −14 | 40 | 45 | 28 |
| C3 | 0 | 190 | 20 | 30 |
| 4 A4 | −15 | 40 | 15 | 31 |
| B4 | −20 | 20 | 95 | 27 |
| C4 | −25 | 40 | 13 | 28 |
| 5 A1 | +11 | 180 | 10 | 28 |
| B1 | −5 | 20 | >300 | 29 |
| C5 | −12 | 70 | 40 | 27 |
| 6 A4 | −15 | 40 | 15 | 31 |
| B3 | −10 | 20 | 45 | 28 |
| C6 | <−30 | 30 | 15 | 29 |
| 7 A11 | −5 | 270 | >300 | 35 |
| B4 | −20 | 20 | 95 | 27 |
| C7 | −19 | 30 | 25 | 28 |
| 8 A5 | +25 | 70 | 20 | 31 |
| B5 | −6 | 20 | >300 | 32 |
| C8 | −6 | 60 | 50 | 31 |
| 9 A6 | −25 | 20 | >300 | 29 |
| B7 | −13 | 10 | 150 | 28 |
| C9 | −17 | 20 | 115 | 29 |
| 10 A7 | +45 | 240 | 220 | 42 |
| B9 | −13 | 20 | 65 | 29 |
| C10 | −20 | 80 | 40 | 32 |
| 11 A8 | +8 | 120 | 110 | 33 |
| B6 | −18 | 70 | 85 | 29 |
| C11 | −19 | 120 | 60 | 30 |
| 12 A9 | +5 | 200 | >300 | 40 |
| B8 | −22 | 20 | 120 | 29 |
| C12 | −23 | 90 | 70 | 32 |
| 13 A10 | +15 | 280 | 30 | 31 |
| B10 | −15 | 0 | 110 | 27 |
| C13 | <−30 | 10 | 25 | 26 |
| 14 A12 | −10 | 100 | >300 | 42 |
| B8 | −22 | 20 | 120 | 29 |
| C14 | −26 | 20 | 75 | 29 |
| 15 A2 | +15 | 20 | 75 | 29 |
| B5 | −11 | 20 | >300 | 32 |
| C15 | −5 | 40 | 35 | 29 |

As the examples show, the pour points of the surfactant compositions according to the invention are in some instances far below the pour points of the nonionic surfactants and surfactant formulations used. By virtue of this obviously large synergistic effect, the novel surfactant compositions have extremely good low temperature characteristics. The other properties tested, in particular the foaming characteristics, also give good results.

The test methods for the individual property are briefly described below:

The pour point was determined in accordance with DIN-ISO 3016. 50 to 80 g of surfactant composition were introduced into a beaker and cooled until the composition, which was liquid and easily pourable at room temperature, was no longer pourable. This temperature is taken as the pour point of the composition.

The foaming index was determined in accordance with DIN 53 902. 1 g of the surfactant composition was dissolved in a liter of deionized water. About 200 ml of this solution were introduced into the 1,000 ml measuring cylinder and impacted thirty times with the perforated impact disk. The resulting depth of foam in the measuring cylinder, expressed in milliliters, is the foaming index. The surface tension was determined in accordance with DIN 53 914. 0.1 g of the surfactant composition was dissolved in one liter of deionized water. The surface tension of this solution was measured with the customary tensiometer by the ring detachment method in mN/m.

The wetting ability was determined in accordance with DIN 53 901. 1 g of the surfactant composition was dissolved in one liter of deionized water. A small square of cottonwool was immersed in the solution. The time taken from immersion of the small square until it began to sink further into the solution was measured. This time in seconds is a measure of the wetting ability (if the cottonwool square is wetted rapidly, implying a high wetting ability, it sinks after only a few seconds).

We claim:

1. A process for preparing of low-foaming and low-temperature-stable liquid surfactant composition which comprises mixing together 1 part by weight of at least one nonionic surfactant and 0.3 to 9 parts by weight of an aqueous surfactant formulation to form a homogeneous and essentially clear liquid, said aqueous surfactant formulation being made by a) mixing an anionic surfactant and a cationic surfactant in a mole ratio of 1:(0.3 to 5) with water in an amount of from 50 to 80% by weight at a temperature of 25° to 95° C., the percentages by weight being based on the total weight of anionic surfactant, cationic surfactant and water, said cationic surfactant being quaternary ammonium salt of the formula $N^{30}(R^1,R^2, R^3, R^4)X^-(1)$ in which $R^1$ and $R^2$ are the same or different and are selected from the group consisting of an alkyl radical having 1 to 4 carbon atoms, an oxyalkylene radical having 1 to 10 ethylene oxide units, an oxyalkylene radical having 1 to 10 propylene oxide units and an oxyalkylene radical having 1 to 10 ethylene oxide and propylene oxide units, $R^3$ is an alkyl radical or an alkenyl radical having 6 to 22 carbon atoms, $R^4$ is a alkyl radical or an alkenyl radical having 6 to 22 carbon atoms or the benzyl radical and $X^-$is an anion or an inorganic or organic acid, allowing the mixture obtained in step a) to separate in two sharply distinguished liquid phases, and separating off said aqueous surfactant formulation in the upper phase.

2. A process as claimed in claim 1, wherein 1 part by weight of at least one nonionic surfactant and 0.4 to 4 parts by weight of the surfactant formulation are mixed together.

3. A process as claimed in claim 1, wherein 1 part by weight of at least one nonionic surfactant and 0.4 to 2.5 parts by weight of the surfactant formulation are mixed together.

4. A process as claimed in claim 1, wherein in step a) the anionic surfactant and the cationic surfactant are mixed with water in an amount of from 50 to 80% by weight at a temperature of 40° to 85° C.

5. A process as claimed in claim 1, wherein in step a) the anionic surfactant and the cationic surfactant are used in a mole ratio of 1:(0.4 to 2) and mixed with water in an amount of from 60 to 80% by weight at a temperature of 40° to 85° C.

6. A process as claimed in claim 1, wherein the anionic surfactant is a $C_6$ to $C_{22}$-alkanesulfonate, $C_6$ to $C_{22}$-α-olefinsulfonate, ($C_6$ to $C_{22}$-alkyl)benzenesulfonate, N-$C_6$ to $C_{22}$-acyl-N-methyl-1-aminoethane-2-sulfonate, mono-$C_6$ to $C_{22}$-alkyl sulfosuccinate or di-$C_6$ to $C_{22}$-alkyl sulfosuccinate, $C_6$ to $C_{22}$-fatty alcohol sulfate or an oxyethylated $C_6$ to $C_{22}$-fatty alcohol sulfate with 1 to 20 ethylene oxide units, and the cationic surfactant is one of the formula (1) in which $R^1$ and $R^2$ are an alkyl radical having 1 to 4 carbon atoms or an oxyalkylene radical having 1 to 10 ethylene oxide units, propylene oxide units or ethylene oxide units and propylene oxide units, $R^3$ is an alkyl radical having 8 to 14 carbon atoms, $R^4$ has one of the meanings of $R^3$ or is a benzyl radical and $X^-$ is an anion of an inorganic or organic acid.

7. A process as claimed in claim 1, wherein the nonionic surfactant is one from the group of polyglycol ethers.

8. A process as claimed in claim 1, wherein the nonionic surfactant is an oxyalkylate of $C_8$ to $C_{18}$-alcohols, ($C_4$ to $C_{12}$-alkyl)phenols, $C_8$ to $C_{18}$-fatty acids, $C_8$ to $C_{18}$-fatty amines, $C_8$ to $C_{18}$-fatty acid amides or of ($C_8$ to $C_{18}$-fatty acid)ethanolamides, having 2 to 30 ethylene oxide units, propylene oxide units or ethylene oxide units and propylene oxide nits or is an ethylene oxide/-propylene oxide block copolymer which consists of a propylene oxide inner block having a molecular weight from 1,000 to 3,000, and of 5 to 50% by weight of ethylene oxide, the percentages by weight being based on the block copolymer.

9. A process as claimed in claim 1, wherein the nonionic surfactant is an oxyethylate of $C_8$ to $C_{18}$-alcohols, ($C_4$ to $C_{12}$-alkyl)phenols, $C_8$ to $C_{18}$-fatty acids, $C_8$ to $C_{18}$-fatty amines, $C_8$ to $C_{18}$-fatty acid amides or of ($C_8$ to $C_{18}$-fatty acid)ethanolamides, having 2 to 30 ethylene oxide units, or is an ethylene oxide/propylene oxide block copolymer which consists of a propylene oxide inner block having a molecular weight from 1,500 to 2,500, and of 10 to 30% by weight of ethylene oxide, the percentages by weight being based on the block copolymer.

* * * * *

UNITED STATES PATENT AND TRADEMARK OFFICE

CERTIFICATE OF CORRECTION

PATENT NO. : 5,298,193

DATED : March 29, 1994

INVENTOR(S) : Klinger et al

It is certified that error appears in the above-indentified patent and that said Letters Patent is hereby corrected as shown below:

In claim 1, column 12, line 24, please after the word "being", please insert the word --a-- thereof.

In claim 1, column 12, line 25, "$N^{30}$" should read --$N^+$--.

In claim 1, column 12, line 33, "a" should read --an--.

In claim 1, column 12, line 36, the word "or" should read --of--.

UNITED STATES PATENT AND TRADEMARK OFFICE

CERTIFICATE OF CORRECTION

PATENT NO. : 5,298,193

DATED : March 29, 1994

INVENTOR(S) : Klinger et al

It is certified that error appears in the above-indentified patent and that said Letters Patent is hereby corrected as shown below:

In claim 1, column 12, line 37, --b)-- should be inserted at the beginning of the line before the word "allowing".

In claim 1, column 12, line 38, after the word "and", please start a new paragraph and insert --c)-- thereof.

In claim 8, column 13, line 14, "nits" should read --units--.

Signed and Sealed this

Sixth Day of September, 1994

Attest:

Bruce Lehman

BRUCE LEHMAN

*Attesting Officer*

*Commissioner of Patents and Trademarks*